Figure 1:
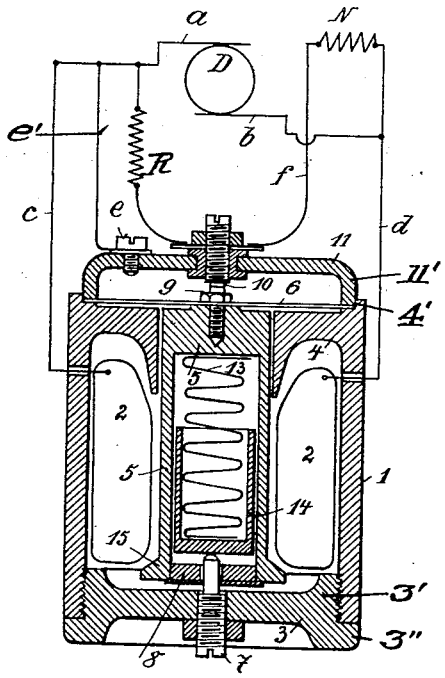

F. MÜNZ.
VOLTAGE REGULATOR FOR ELECTRIC DYNAMOS.
APPLICATION FILED MAY 4, 1920.

1,373,520.

Patented Apr. 5, 1921.

Inventor
F. Münz,
By H. R. Kerslake
Attorney

UNITED STATES PATENT OFFICE.

FRIEDRICH MÜNZ, OF STUTTGART, GERMANY.

VOLTAGE-REGULATOR FOR ELECTRIC DYNAMOS.

1,373,520.  Specification of Letters Patent.  Patented Apr. 5, 1921.

Application filed May 4, 1920. Serial No. 378,913.

*To all whom it may concern:*

Be it known that I, FRIEDRICH MÜNZ, residing at Stuttgart, Germany, have invented certain new and useful Improvements in Voltage-Regulators for Electric Dynamos, of which the following is a specification.

The invention relates to improvements in voltage regulators for electric dynamos, generators, and the like.

It is a well known fact that in the charging and recharging of electrical accumulators or storage batteries that the voltage of the dynamo or generator used for such purpose must not exceed the highest charging voltage required for any particular type or make of accumulator or storage battery, and if such excessive voltage occurs it results in the serious damage of the latter and often to an extent necessitating the complete renewing of the active and essential parts of the same. In the installation of a dynamo or generator on automobiles and the like, this generation of excessive voltage is liable to frequently occur by reason of the wide fluctuation in speed of the engine from which the dynamo or generator is driven, and it often happens that the voltage generated exceeds the highest permissible voltage figure of the accumulators or storage batteries carried by the automobile, with the result that attempts to charge the latter at certain periods in the running of the automobile, the same are overcharged or otherwise ruined and, consequently, unfit for further use.

In order to overcome this difficulty, the invention contemplates, in general, the insertion in the field winding, or circuit of a dynamo or generator, of a resistance capable of being varied throughout a range sufficient for the purpose of limiting the voltage output thereof corresponding to that required by the accumulator or storage battery to be charged or recharged. The invention further contemplates the use of a device for so varying the resistance, aforesaid, which device is preferably in the nature of a solenoid whose action depends upon the voltage output of the dynamo or generator, so that it will be effected correspondingly with fluctuations in the voltage, caused by any fluctuations in speed at which the latter is driven, and will consequently, maintain the voltage output of the dynamo or generator within the maximum safe limits as required for the proper charging or recharging of the accumulator or storage battery connected therewith.

In the particular adaptation of the device for use in connection with dynamos or generators installed on automobiles, the invention has for one of its objects the construction of the device in a manner that its magnetic action is unaffected by any and all jolting or vibration to which it may be subjected during the running of the automobile, which construction and accomplishment will be hereinafter more fully described.

Among other objects of the invention, therefore, the same provides for a device which accomplishes absolute regulation of the voltage output automatically and correspondingly with any and all fluctuation in the speed at which the dynamo or generator is driven.

With the foregoing and other objects in view, the invention resides in the certain novel and useful construction and arrangement of parts and circuits as will be hereinafter more fully described, set forth in the appended claims, and illustrated in the accompanying drawing, in which:—

Figure 2:
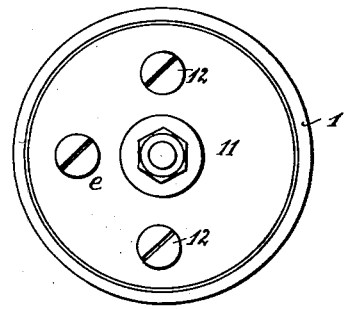

Figure 1 is a longitudinal section through a form of the device, and showing the manner of its connection and operation with a dynamo or generator, the latter being diagrammatically illustrated for the purpose, and, Fig. 2 is a plan view of one end of the device.

Referring to the drawing, the device consists of a cylindrical iron shell or casing 1, in the interior of which is placed a voltage or energizing coil 2. The bottom or outer end of the shell or casing 1 is closed by means of a lid or cover plate 3, which is preferably formed with a threaded flanged portion 3′ adapted to be inserted into the open end of the same and in threaded engagement with the inner wall thereof. The outer face of the lid or cover plate 3 is preferably formed with a central depression surrounded by a radially extending flange 3″ which is adapted to abut the end of the shell or casing 1. A hollow iron core 5, of cylindrical form, is passed through an opening formed centrally of the inner or integrally formed end wall 4 of the shell or casing 1, and through the open center of the voltage coil 2. The iron core 5 is retained in position centrally of the shell or casing 1 and the opening in the inner end wall thereof by means of an elastic diaphragm 6, which is of circular form and rests on an annular shouldered portion 4' formed in the outer face of the inner integral end wall of the shell or casing. The adjacent end of the core 5 is secured centrally of the diaphragm 6 by means of a contact screw 9, while the opposite or lower end of the same, normally open, is closed by a guide plate 8, of a non-magnetic material, and having a central opening for the reception of a loosely fitting stem projecting from a screw 7 which is threaded centrally through the wall of the lid or cover-plate 3 for suitable or desired adjustment therein. A securing nut is threaded on the outer projecting end of the screw 7 and rests against the bottom wall of the recessed or depressed portion of the lid. A contact screw 10 is held in alinement with the screw 9 by being threaded through a bushing of insulating material carried by a cap member 11, the latter being of circular form and having an annular flange 11' adaped to seat upon the annular shoulder 4' and clamp therebetween the outer edge of the diaphragm 6. The cap is held in position by means of screws 12 passing through the wall thereof and engaging threaded openings formed in the outer face of the integral wall 4 of the shell or casing 1, and by means of which tightly clamps the diaphragm in position on the annular shoulder 4'. A coiled spring 13 is disposed within the hollow center of the core 5 with one of its ends abutting the integral upper wall of the core and its other end surrounded by damping cylinder or member 14 and abutting the closed end of the latter, which, in turn, abuts the point of the stem of the screw 7. The action of the spring 13 operates to continuously press the core 5 upward of the casing so that the contact 9 is held against the contact 10, the pressure exerted by the tension of the spring 13 depending upon the adjustment of the screw 7. The lower end of the core 5 is formed to provide a flange or collar portion 15 which acts to facilitate the passage of the magnetic lines of force from the coil 2 and the core 5 to the lid or cover-plate 3, and to thus assure reliable action of the device. The non-magnetic plate or disk 8 is arranged to project slightly below the flanged end of the core so as to prevent direct contact between the iron core 5 and the iron lid 3 which would otherwise result in the core sticking fast to the lid or cover-plate.

It is to be noted of the iron core 5, that the same being made hollow, it is of a minimum weight, and, consequently, reacts on the most delicate potential variations without undue or relatively large oscillations, the open end of the same admitting the inclosing within the hollow center of the spring tensioning means 13 and the dampening cylinder 14, all in a manner to provide a comparatively compact construction, and one in which liability to damage or disarrangement of the parts from mechanical shock caused by the jolting of a motor vehicle is reduced to a minimum.

With the device thus provided, and when the same is connected with a dynamo or generator as shown in Fig. 1, its operation is, as follows:—

Current from the dynamo or generator D passes through the brushes $a$ and $b$ and by way of conductors $c$ and $d$, respectively, to the voltage or energizing coil 2, and as long as the excitation of the coil 2 is not strong enough to attract the iron core 5, the current from the brush $a$ is shunted around the resistance R by way of conductor $e'$, screw $e$, casing 1, the elastic diaphragm 6, and movable contact 9, stationary contact 10 and into the conductor $f$ and field winding N to brush $b$. When the voltage of the dynamo rises excessively, the voltage coil 2 pulls the iron core 5 inward of the casing 1, and interrupts the flow of current by separating the contacts 9 and 10, so that the current from the brush $a$ now flows through the resistance R, the contact 10, wire or conductor $f$, the field winding N to brush $b$, and the voltage is lowered. The damping cylinder or sleeve 14, in the iron core 5, is provided to prevent undue oscillations of the iron core 5, and to render the same more positive in its movements to make and break the circuit between the contacts 9 and 10. The cylinder or sleeve 14 being in the nature of usual forms of shields, such as are used to prevent undue shifting or limiting of magnetic fields, and in its present use, acts to prevent the free shifting of the core 5 under the influence of the magnetic field of the coil 2.

Having thus fully described the invention, what is claimed, is:—

1. In a device of the class described, a cylindrical casing, a voltage coil within said casing, a hollow iron core of cylindrical form movable centrally within said coil and outward of one end of said casing, a diaphragm supporting said core in operative position, a stationary contact, a second contact in alinement with said stationary contact and movable with said core, a resistance connected between said stationary contact and said movable contact, adjustable means for tensioning said core against normal magnetic influence of said coil, and means within the hollow center of the iron core for damping the movements thereof.

2. In a device of the class described, a cylindrical casing open at one end and having its other end partially closed by an integral wall surrounding an opening of substantially less diameter than the open end thereof, a voltage coil within said casing, an iron core of hollow cylindrical form movable centrally of said coil and slightly outward of the opening of the partially closed end of said casing, a stationary contact insulated from said casing, a second contact carried by said core and movable into and out of engagement with said stationary contact, a resistance coil connected between said stationary contact and said movable contact, adjustable means for tensioning said core against normal magnetic influences of said voltage coil, means within the hollow center of said iron core for damping the movements thereof, and a cover-plate for closing the open end of said casing.

3. In a device of the class described, a cylindrical casing open at one end and having its other end partially closed by an integral wall surrounding an opening of substantially less diameter than the open end thereof, a voltage coil within said casing, an iron core of cylindrical form movable centrally of said coil and slightly outward of the opening of the partially closed end of said casing, a stationary contact insulated from said casing, a diaphragm extending across the partially closed end of said casing and spaced slightly therefrom, a contact screw connecting the adjacent end of said core centrally of said diaphragm and adapted to be moved therewith into and out of engagement with said stationary contact, a resistance coil connected between said stationary contact and said movable contact, adjustable means for tensioning said core against normal magnetic influences of said voltage coil, means within said casing for damping the movements of said core, and a cover-plate for closing the open end of said casing.

4. In a device of the class described, a cylindrical casing open at one end and having a circular opening formed centrally of the integral end wall opposite to the open end thereof, a voltage coil within said casing, an iron core of cylindrical form movable centrally of said coil and slightly outward of the circular opening in the integral end wall of said casing, a cover plate closing the open end of said casing, said integral end wall of said casing being centrally recessed to provide an annular shoulder adjacent the periphery thereof, a diaphragm, a cap member inclosing said diaphragm and clamping the edge thereof against said annular shoulder, a contact screw insulated from and supported centrally of said cap member, a second contact screw disposed centrally of said diaphragm in alinement with said first mentioned contact screw and securing the adjacent end of said core thereto, adjustable means for tensioning said core against normal magnetic influences of said voltage coil, means within said casing for damping the movements of said core, and a resistance coil connected between said contact screws.

5. In a device of the class described, a cylindrical casing open at one end and having a circular opening formed centrally of the integral end wall opposite to the open end thereof, a voltage coil within said casing, an iron core of cylindrical form movable centrally of said coil and slightly outward of the circular opening in the integral end wall of said casing, a cover plate closing the open end of said casing, an adjusting screw projecting inwardly of said cover plate and having a shank portion for guiding the opposite end of said core, said integral end wall of said casing being centrally recessed to provide an annular shoulder adjacent the periphery thereof, a diaphragm, a cap member inclosing said diaphragm and clamping the edge thereof against said annular shoulder, a contact screw insulated from and supported centrally of said cap member, a second contact screw disposed centrally of said diaphragm in alinement with said first mentioned contact screw and securing the adjacent end of said core thereto, adjustable means for tensioning said core against normal magnetic influences of said voltage coil, means within said casing for damping the movements of said core, and a resistance coil connected between said contact screws.

6. In a device of the class described, a cylindrical casing open at one end and having a circular opening formed centrally of the integral end wall opposite to the open end thereof, a voltage coil within said casing, a hollow iron core of cylindrical form and open at one end movable centrally of said coil and slightly outward of the circular opening in the integral end wall of said casing, a plug of non-magnetic material closing the open end of said core, a cover plate closing the open end of said casing, an adjusting screw projecting inwardly of said cover plate and having a shank portion engaging an opening formed in said plug for guiding the opposed end of said core, said integral end wall of said casing being centrally recessed to provide an annular shoulder adjacent the periphery thereof, a diaphragm, a cap member inclosing said diaphragm and clamping the edge thereof against said annular shoulder, a contact screw insulated from and supported centrally of said cap member, a second contact screw disposed centrally of said diaphragm in alinement with said first mentioned contact screw and securing the adjacent end of said core thereto, a coiled spring within said core for tensioning said core against normal magnetic influences of said voltage coil, a cylinder open at one end engaged over the free end of said coiled spring and having its end wall abutting the inner end of the shank portion of said adjusting screw whereby upon the manipulation of the latter the tension of said spring may be varied, and a resistance coil connected between said contact screws.

7. In a device of the class described, a casing, a voltage coil within said casing, an iron core of tubular form open at one end and movable centrally within said voltage coil and outward of one end of said casing, means for positioning said iron core for comparatively free movement, a stationary contact, a second contact in alinement with said stationary contact and movable with said iron core, a resistance connected between said stationary contact and said movable contact, adjustable means operating inwardly of the open end of said iron core for tensioning the latter against normal magnetic influence of said voltage coil, and means within the hollow center of said iron core for damping the movements thereof.

In testimony whereof I affix my signature in presence of two witnesses.

FR. MÜNZ.

Witnesses:
ANTON MARX,
ELSA SCHÖLLHORN.